UNITED STATES PATENT OFFICE.

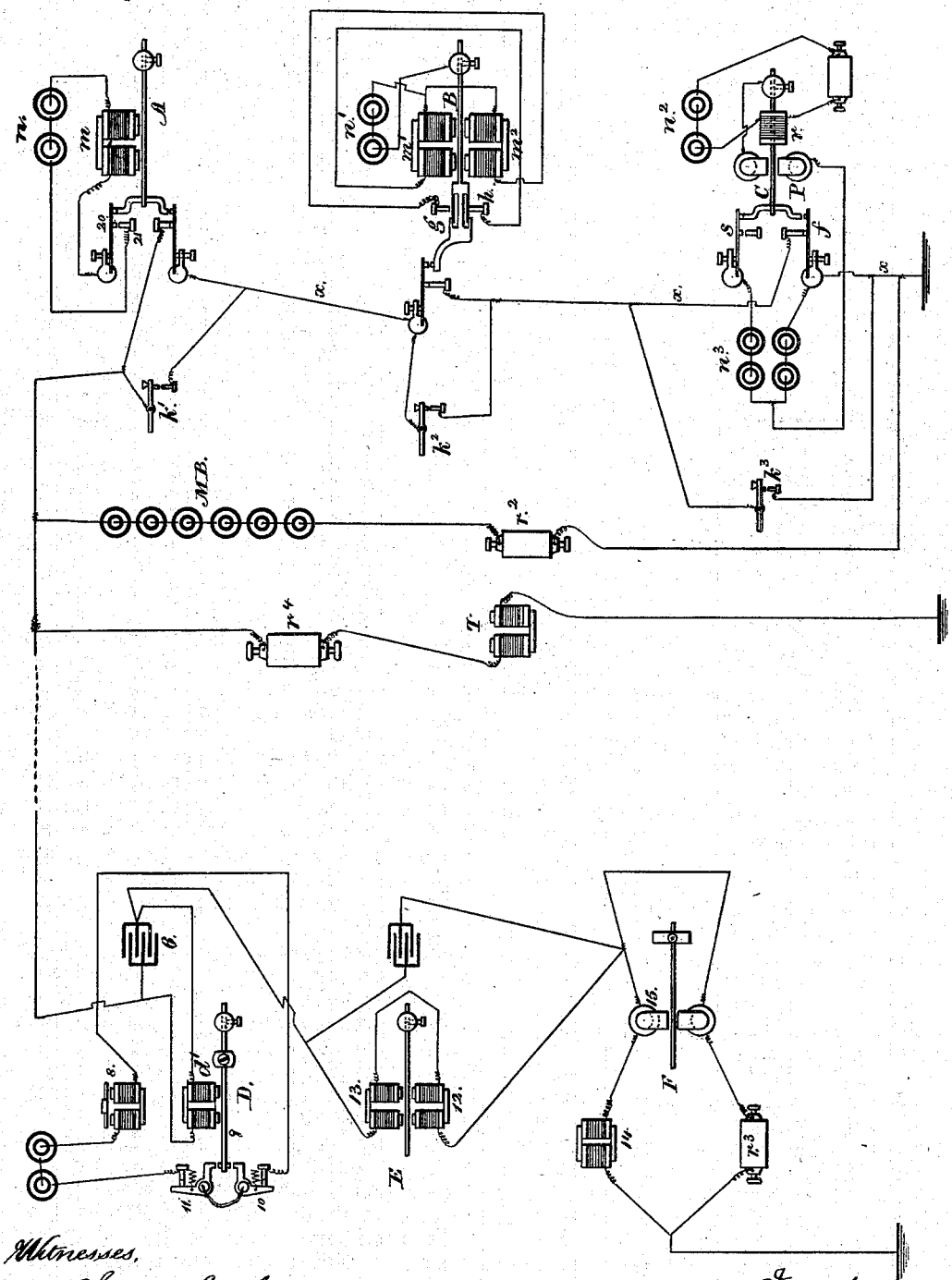

THOMAS A. EDISON, OF MENLO PARK, NEW JERSEY, ASSIGNOR TO THE WESTERN UNION TELEGRAPH COMPANY.

IMPROVEMENT IN ACOUSTIC ELECTRIC TELEGRAPHS.

Specification forming part of Letters Patent No. 186,330, dated January 16, 1877; application filed May 16, 1876.

*To all whom it may concern:*

Be it known that I, THOMAS A. EDISON, of Menlo Park, in the county of Middlesex and State of New Jersey, have invented an Improvement in Acoustic Telegraphs, of which the following is a specification:

The object of this invention is to employ a main battery always in the close circuit of the main line, and to use a short-circuiting wire for that main battery, so arranged with reference to the vibrating reeds that the vibrations shall open and close the short-circuiting wire; hence, the main battery will send its pulsations on the main line when the short circuit is broken.

In the drawing, A, B, and C represent reeds that are vibrated by local circuits and electro-magnets, and they are of varying tones, so as to vibrate in different periods of time, and the vibrations of the reeds are made to open and close the local circuits. The reed A is provided with an electro-magnet, $m$, local circuit and battery $n$, and contact-points 20 21, that are opened as the reed is attracted by the electro-magnet; hence the vibrations will be continuous.

The reed B is between two magnets, $m^1$ $m^2$, and these are connected in local circuits from the battery $n^1$, and there are at opposite sides of the reed B the contact-points $g$ $h$, and the wires are arranged so that when the reed closes against $g$ the circuit passes through B from $n^1$, and by $g$ through $m^2$ to $n^1$, attracting the reed from $g$, and when the reed closes against $h$ the current is thrown through $m^1$. This insures uniformity in the vibrations of the reed as the powers operating are equal upon both sides of it, and the movement will be equal each way from a state of rest, regardless of the power of the battery. The reed C passes through the helix $r$, and hence it is magnetized by the current from a local battery, $n^2$. The reed C might be a permanent magnet; but I prefer to magnetize it by a helix. These are two lateral cores from the electro-magnet P, at opposite sides of the reed C, and the battery $n^3$ is connected to the circuit-closing points $f$ $s$, between which is the reed $c$, the middle of the battery connected to the magnet P, and thence to the reed C. By this arrangement of circuits the current through P will be in first one direction and then the other, and the polarity of the cores alternately changed to act by attraction and repulsion equally, first one way and then the other upon the reed. This causes the vibrations of the reed to be very regular and uniform, and prevents sluggishness by residual magnetism.

The keys $k^1$, $k^2$, and $k^3$ are in branch wires of the short-circuiting wire $x$, and the normal position of these keys is open, and as the wire $x$ would short-circuit the main battery M B, if the contact-points of the respective reeds were all closed there would not be any current sent upon the line; but a pulsation will be sent for each break made in the short-circuiting wire $x$; hence, the pulsations will pass over the line-wire according to the times of vibration of the various reeds. Whichever key $k^1$, $k^2$, or $k^3$ is closed the corresponding reed A, B, or C will cease to send waves upon the line, as its contact-points will be short-circuited, and hence the corresponding reed, at the distant station, will come to a state of rest and close their local circuits, or otherwise produce the given signal.

The rheostat $r$ 2 is introduced to form a resistance in the short circuit and to lessen the sparks at the contact-points. The rheostat $r$ 4 and electro-magnet T are introduced in a branch from the main line to the earth, either at the transmitting or receiving station to allow a portion of the current to pass to earth, and by the discharge of the electro-magnet to set up a counter-current that neutralizes the static charge of the line.

The receiving-instrument D is provided with the reed 9, that is vibrated by the electro-magnet $d'$ in the main line, and there is a shunt-circuit containing a condenser, 6, which serves to neutralize the effect of the self-induction in the magnet, and to lessen the risk of the reed being affected by the currents that pass through the magnet, and pulsate at a different rate to the vibrations of this reed 9.

I find in practice that in an acoustic telegraph a condenser acts, in connection with the magnet, to increase the length of vibration of the reed, while under similar circumstances a condenser used with an ordinary sounder causes it to stick and have a tardy movement.

The levers 10 and 11 are applied at opposite sides of the vibrating end of the reed, and increase the motion at the contact-points, which close and open the local circuit to the relay or sounder magnet 8.

The reed E is between the cores of the electro-magnets 12 and 13, and the helices of these magnets are both in the main-line circuit. The cores of one of these magnets is covered with a metallic tube, which causes a circulation of the self-induction currents of the magnet, and prevents the rapid demagnetization of the cores. This produces in the magnet 12, containing such tube, nearly a constant attractive force, and in the other magnet 13 will receive clear sharp impulses. This construction is advantageous, because the electro-magnet 12 is a constant attractive force, that prevents the reed responding to pulsations in 13 that do not correspond with its time of vibration.

The polarized reed F is between the two projections of the magnet 15, and 14 is an electro-magnet with its armature in contact with its cores, and this magnet is in the branch wire running through one of the spools of the magnet 15, and in the other branch wire passing through the other spools is a rheostat, $r^3$. The current from the distant station produces no direct effect in 15, but the induced current set up in the magnet 14, reacting through the magnet 15, produces vibrations of the reed when those pulsations harmonize with its period of vibration.

I claim as my invention—

1. The main battery M B, and short-circuiting connection $x$, both between the line and the earth, in combination with a series of reeds or vibrating transmitting-instruments and contact-points opened and closed by the reeds, substantially as set forth.

2. The magnets $m^1$ $m^2$, vibrating reed B, circuit-closers $g$ and $h$, local battery $n'$, and connections, arranged substantially as set forth, whereby the circuits, through the respective magnets, are entirely broken alternately by the vibration of the reed, as specified.

3. The combination, with a polarized vibrating reed, of an electro-magnet and circuits, substantially as set forth, whereby currents of alternating polarity are passed through the electro-magnet by the circuit-closers that are operated by the reed, substantially as set forth.

4. The combination, with the main battery and shunt between the line and earth, reeds, and contact-points, operated by such reeds, of finger-keys placed in short circuits around the circuit-closing points, substantially as set forth.

5. In an acoustic telegraph receiving-instrument, the combination, with the receiving-magnet, of a condenser, in a shunt around such magnet, substantially as set forth.

6. The combination, with the reed 9, of the levers 10 and 11, contact-points, local circuit, and receiving magnet or sounder 8, substantially as set forth.

7. The magnets 12 and 13, at opposite sides of the vibrating reed, and in the main-line circuit, with tubes around the cores of one of the magnets, for the purposes set forth.

8. The magnet 15, with its cores in branches of the main line, in combination with the polarized reed induction-magnet 14, and resistance $R^3$, substantially as set forth.

Signed by me this 9th day of May, A. D. 1876.

THOS. A. EDISON.

Witnesses:
J. D. RUSS,
CHAS. BATCHELOR.